G. R. PIERPONT.
Straw-Cutter.
No. 202,751. Patented April 23, 1878.
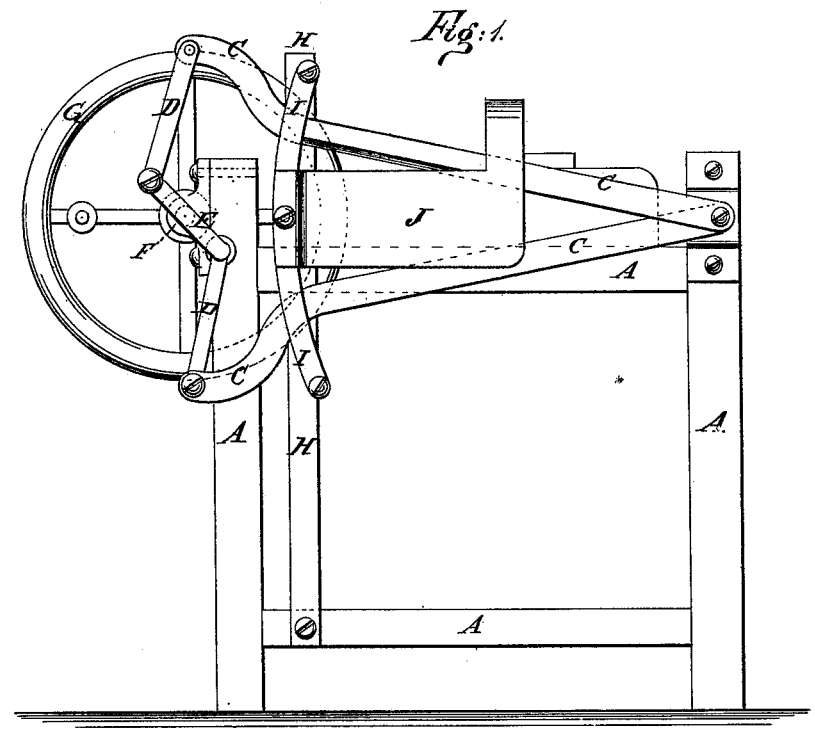
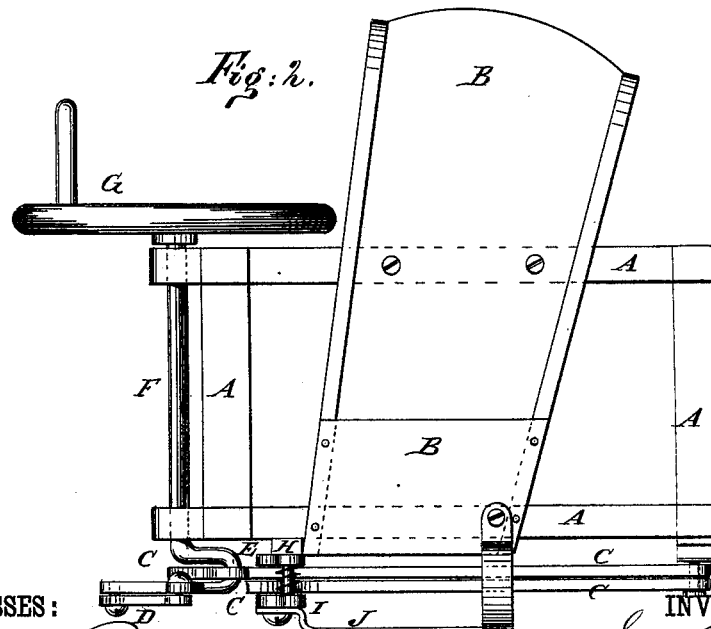
WITNESSES:
Chas. Nida
C. Sedgwick
INVENTOR:
G. R. Pierpont
BY Munn & Co
ATTORNEYS.

UNITED STATES PATENT OFFICE.

GEORGE RUFUS PIERPONT, OF NORTH HAVEN, CONNECTICUT.

IMPROVEMENT IN STRAW-CUTTERS.

Specification forming part of Letters Patent No. 202,751, dated April 23, 1878; application filed March 4, 1878.

*To all whom it may concern:*

Be it known that I, GEORGE RUFUS PIERPONT, of North Haven, in the county of New Haven and State of Connecticut, have invented a new and useful Improvement in Straw-Cutters, of which the following is a specification:

Figure 1 is a front view of my improved machine. Fig. 2 is a top view of the same.

Similar letters of reference indicate corresponding parts.

The object of this invention is to furnish an improved machine for cutting hay, straw, &c., for feed, which shall be simple in construction, convenient in use, easily operated, and effective in operation.

The invention consists in the combination of the two pivoted blades, the two pivoted connecting-bars, the double crank, the shaft, and the crank fly-wheel with each other and with the frame and the feed-box; and in the combination of the gage-plate with the two pivoted blades and the feed-box, as hereinafter fully described.

A represents the frame of the machine, which may be rectangular in form or of other convenient shape, and to the top of which is attached the feed-box B.

To the frame A, at one side of the forward end of the feed-box B, are pivoted the ends of two blades, C, by the same bolt. The blades C cross the forward end of the feed-box B, and their other ends are curved from each other, and are pivoted to the outer ends of two connecting-bars, D, the inner ends of which are pivoted to the opposite parts of the double crank E, formed upon the forward end of the shaft F. The shaft F revolves in bearings attached to the frame A, and to its rear end is attached a crank-wheel, G, which is made large and heavy, to adapt it to serve also as a balance or fly-wheel, to give steadiness of motion to the machine.

The crank fly-wheel G is so placed that the operator can turn it with one hand while he feeds the machine with the other hand.

The blades C are held together while being operated by the upright bar H, bolted to the frame A, and by the curved bar I, secured to the bar H by screws or bolts, so that it may be adjusted to take up the wear.

To the bar I and to the top of the feed-box B, or to some other suitable support, and in such a position as to be directly in front of the feed-box B, is secured a plate, J, to limit the forward movement of the material when feeding it forward to be cut, and thus serve as a gage-plate. The plate J should be secured in place adjustably, so that it may be adjusted as a longer or shorter cut is desired.

With this construction the material is cut by the blades C, as they move toward each other, in the manner of the blades of a pair of shears, and the material is moved forward between them as they move from each other.

Having thus described my invention, I claim as new and desire to secure by Letters Patent—

1. The combination of the two pivoted blades C, the two pivoted connecting-bars D, the double crank E, the shaft F, and the crank fly-wheel G with each other and with the frame A and the feed-box B, substantially as herein shown and described.

2. The combination of the gage-plate J with the two pivoted blades C and the feed-box B, substantially as herein shown and described.

GEORGE RUFUS PIERPONT.

Witnesses:
FRED. H. STILES,
FRANK J. HINMAN.